(12) United States Patent
Roos et al.

(10) Patent No.: US 9,052,467 B2
(45) Date of Patent: Jun. 9, 2015

(54) OPTICAL FIBER CONNECTOR

(75) Inventors: Sven-Olov Roos, Floda (SE); Daniel Bengtsson, Kållered (SE); Ola Blomster, Mölndal (SE)

(73) Assignee: OPTOSKAND AB, Mölndal (SE)

( * ) Notice: Subject to any disclaimer, the term of this patent is extended or adjusted under 35 U.S.C. 154(b) by 1473 days.

(21) Appl. No.: 12/278,893

(22) PCT Filed: Feb. 6, 2007

(86) PCT No.: PCT/SE2007/000113
§ 371 (c)(1),
(2), (4) Date: Mar. 3, 2009

(87) PCT Pub. No.: WO2007/091953
PCT Pub. Date: Aug. 16, 2007

(65) Prior Publication Data
US 2009/0310917 A1    Dec. 17, 2009

(30) Foreign Application Priority Data
Feb. 8, 2006   (SE) ...................................... 0600263

(51) Int. Cl.
*G02B 6/36*     (2006.01)
*G02B 6/38*     (2006.01)

(52) U.S. Cl.
CPC ............ *G02B 6/3813* (2013.01); *G02B 6/3814* (2013.01)

(58) Field of Classification Search
USPC ..................................................... 385/70, 72
See application file for complete search history.

(56) References Cited

U.S. PATENT DOCUMENTS

| | | | |
|---|---|---|---|
| 4,521,070 A | 6/1985 | Sottini et al. | |
| 4,575,181 A | 3/1986 | Ishikawa | |
| 4,669,818 A | 6/1987 | Myer | |
| 4,944,567 A | 7/1990 | Kuper et al. | |
| 5,276,693 A * | 1/1994 | Long et al. ........................ | 372/6 |
| 5,291,570 A | 3/1994 | Filgas et al. | |
| 6,167,177 A | 12/2000 | Sandstrom et al. | |
| 6,188,820 B1 * | 2/2001 | Yogev ............................. | 385/43 |

(Continued)

FOREIGN PATENT DOCUMENTS

| | | |
|---|---|---|
| DE | 4305313 C1 | 3/1994 |
| EP | 0151909 A2 | 8/1985 |

(Continued)

OTHER PUBLICATIONS

PCT/ISA/210—International Search Report—May 11, 2007.
(Continued)

*Primary Examiner* — Kevin S Wood
(74) *Attorney, Agent, or Firm* — Venable LLP; Eric J. Franklin

(57) ABSTRACT

An optical fiber connector for transmitting high optical power, specifically power exceeding 1 kW. The connector includes an optical fiber having one of its ends in direct optical contact with a body made of a transparent material. The body in connection with the optical fiber end has a surface with an area exceeding the contact surface area of the optical fiber. The surface of the transparent body has a substantially conical design in order to provide an efficient flowing geometry around the contact end of the fiber, to increase the surface area for incident power loss radiation and deviate such radiation towards the optical axis of the connector.

10 Claims, 2 Drawing Sheets

(56) References Cited

U.S. PATENT DOCUMENTS

| | | | |
|---|---|---|---|
| 6,487,324 B2 * | 11/2002 | Montgomery et al. | 385/7 |
| 7,352,949 B2 * | 4/2008 | Huang et al. | 385/142 |
| 2002/0136027 A1 * | 9/2002 | Hansler et al. | 362/559 |

FOREIGN PATENT DOCUMENTS

| | | |
|---|---|---|
| EP | 0349312 A2 | 1/1990 |
| EP | 0483477 A1 | 5/1992 |
| EP | 0619508 A1 | 10/1994 |
| GB | 2255199 A | 10/1992 |
| JP | 7-209554 | 8/1995 |
| JP | 07-318733 | 12/1995 |
| RU | 2031420 C1 | 3/1995 |
| SE | 509706 C2 | 1/1999 |

OTHER PUBLICATIONS

PCT/ISA/237—Written Opinion of the International Searching Authority—May 11, 2007.

Supplementary European Search Report issued by European patent office in counterpart application 07 70 9329, Jul. 29, 2011.

Reason for rejection issued by Japanese patent office in counterpart application 2008-554189, Sep. 9, 2011.

* cited by examiner

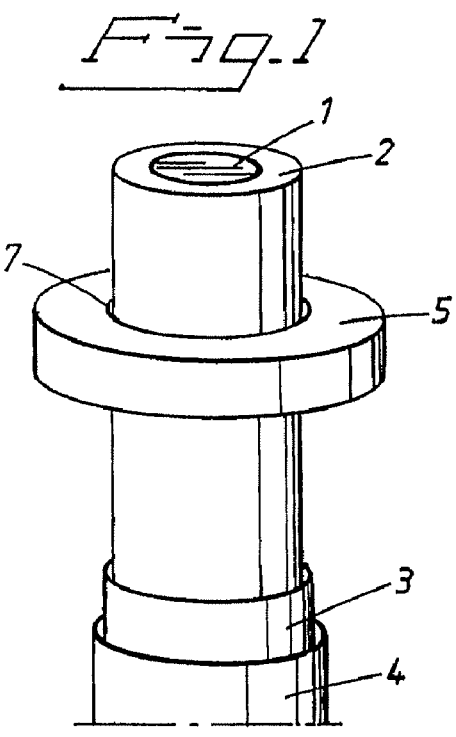
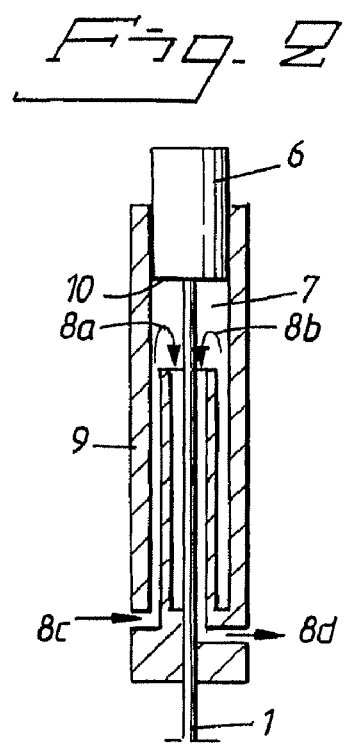
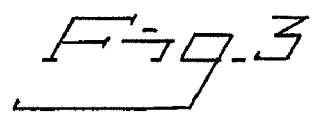
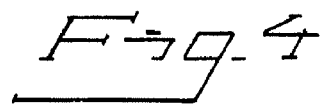
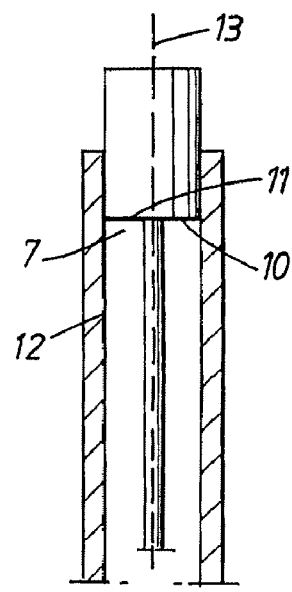
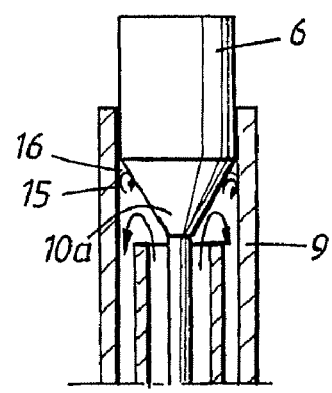

OPTICAL FIBER CONNECTOR

CROSS-REFERENCE TO RELATED APPLICATIONS

This application claims priority to Swedish patent application 0600263-8 filed 8 Feb. 2006 and is the national phase under 35 U.S.C. §371 of PCT/SE2007/000113 filed 6 Feb. 2007.

FIELD OF THE INVENTION

The present invention relates to an optical fiber connector for transmitting high optical power and comprising an optical fiber having one of its ends in direct optical contact with a body made of a transparent material, for instance a rod, bar or the like. High optical power in this context means power up to 10 kw.

BACKGROUND OF THE INVENTION

In order to avoid that the cables, or rather the fiber connectors themselves, are damaged due to such incident radiation that are falling outside the core of the fiber, or due to radiation that are reflected back to the fiber connectors, methods are previously known to take care of such power loss. Specifically, it is previously known to have such incident radiation absorbed in a flowing coolant.

Optical fibre cables for transmitting high optical power are frequently used in industrial applications. Specifically they are used in cutting and welding operations by means of high-power laser radiation, but also in other industrial applications such as heating, detection or working operations in high-temperature environments this type of optical fiber cables can be used. By means of the optical fibers it is possible to design flexible manufacturing systems for transmitting radiation from the high power laser source to the workpiece. Laser sources which can be used in this context have average power from a few hundred watts up to several kilowatts.

Normally, an optical fiber has an inner core of glass for transmitting the radiation and one or more surrounding layers for optically "locking" the radiation into the core. Such a surrounding layer or layers are called the "cladding" of the fiber. Outside the cladding there are also one or more protecting layers to stabilize the fiber mechanically. These layers are called buffers or jackets.

When the fiber is built into a connector the fiber also has to be maintained in a correct position by some mechanical component.

When designing fiber systems for such high power radiation it is important to take care of radiation that falls outside the core of the fiber, due to for instance reflections against the workpiece or due to an incorrect focusing to the fiber, and cool it down in order to prevent uncontrolled heating in the system.

The main reasons for damages on the fiber connectors are
damages due to radiation that falls into the cladding and a subsequent leakage of radiation into the surrounding material, specifically into the area where the buffer and jacket are connected to the fiber, and
damages due to radiation impinging upon the mechanical detail that are adapted to hold the fiber.

Different methods to take care of such unwanted power radiation and protect the fiber components are already known. One example is disclosed in DE 4305313, in which the radiation that falls into the cladding of the fiber is spread in a so-called mode stripper and absorbed by a metal surface. This surface can then be cooled from the outside of the device. Similar methods are described in EP 0 151 909 B1 and U.S. Pat. No. 4,575,181. In EP 0 349 312 B1 it is also described a method to mechanically grip the fiber which reduces the risk for any damages to the surrounding material to a minimum.

An optical fiber in which at least one of the end surfaces of the fiber core is provided with a rod made of a transparent material, for instance quartz, and having a larger diameter than the core diameter, is described in EP 0 619 508. At this end the fiber is provided with a reflector designed to conduct rays entering outside the fiber towards an area where they can be absorbed without causing any damage. In the illustrated embodiment this area is surrounded by a heat-abducting device with cooling fins, but it is also mentioned that water cooling means may be included in this area for cooling off the generated heat. Also in this case the cooling is provided from the outside of the device. A similar arrangement in which the end part of the fiber is provided with a hollow rod and a reflector is described in GB 2 255 199.

One example of a fiber connector which is used today is based on said EP 0 619 508. In this case the fiber is in optical contact with a rod made of quartz and the volume behind the quartz rod is swept over by a flowing coolant that absorbs the radiation, see more in detail in the accompanying FIG. 1. The coolant is normally water, which has an absorption depth of approximately 5 cm for radiation in the area of 1 micrometer.

In SE 509 706 and RU 2031420 it is described a method to take care of power loss in which the radiation heat completely or partially is absorbed directly in a flowing coolant instead of a metal. In SE 509 706 at least one of the contact ends of the fibre is located in a cavity filled with a flowing coolant so that radiation falling outside the fiber is entered into and absorbed at least partially by the coolant. According to a preferred embodiment the fiber is directly in contact with the surrounding coolant, for example water. The advantage by having the radiation absorbed directly in the coolant is a more effective cooling as no heat conducting through for instance a metal part is required before the heat is cooled off.

Due to the all increasing laser power used today the cooling capacity requirements have also been increased. There are two main disadvantages with the above-mentioned quartz rod design. In case of an incorrect focusing of the fiber connector the power density on the surface of the quartz rod might be too high and there is a risk for shock boiling effects in the flowing coolant resulting in damages to the connector. The risk for such damages are also increased due to the fact that the area adjacent to the surface of the quartz rod is not optimized from a flowing point of view. In order to avoid that radiation hits the connector body it is desired that the radiation is deflected towards the optical axis of the fiber.

SUMMARY OF THE INVENTION

The object of this invention is to provide a fiber connector for transmitting optical high power and having a more efficient cooling capacity compared to previous designs.

According to the invention the end surface of the fiber is in optical contact with a body made of a transparent material, for instance quartz, which body in connection with the optical fiber end has a surface area exceeding the contact surface area of the fiber end and has a conical design. By such a design of the surface of the transparent body a more efficient flowing geometry is provided around the fiber end. Furthermore, such a surface provides an increased area for incident power loss radiation as well as deflection of such incident radiation towards the optical axis of the fiber connector.

According to a preferred embodiment there is a space for a flowing coolant around the contact end of the fiber in which space incident radiation which falls outside the core of the fiber at least partially is absorbed in the flowing coolant. The flowing coolant is preferably a fluid, such as water.

In order to improve the flowing geometry the base part of the conical surface might be provided with a shelf or ledge. Such a design reduces the risk for the formation of whirling or turbulent effects in the flowing coolant in the narrow space, corner, which is formed between the base part of the transparent body and the inner wall of the connector.

BRIEF DESCRIPTION OF THE DRAWINGS

In the following the invention will be described more in detail with reference to the accompanying drawings which schematically illustrate some examples of an optical fiber connector and in which FIG. 1 schematically illustrates the general design of an optical fiber connector, FIG. 2 schematically illustrates a fiber connector in which the end surface of the fiber is in optical contact with a body of a transparent material, for instance a quartz rod, FIG. 3 illustrates the fiber connector in case of an incorrect focusing and back reflection of the incident radiation, FIG. 4 illustrates a fiber connector according to the invention.

DETAILED DESCRIPTION OF EMBODIMENTS OF THE INVENTION

Figure 5:
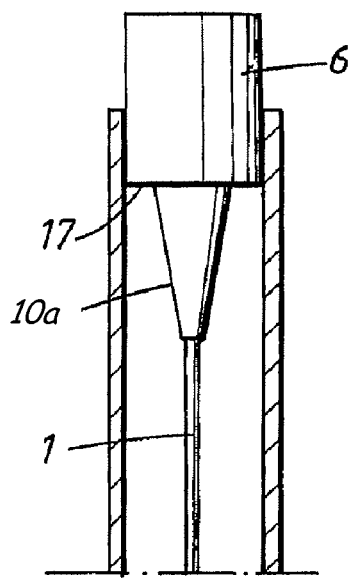
FIG. 5 illustrates an alternative embodiment of the invention in which the conical end surface of the quartz rod is provided with a shelf or ledge.
Figure 6:
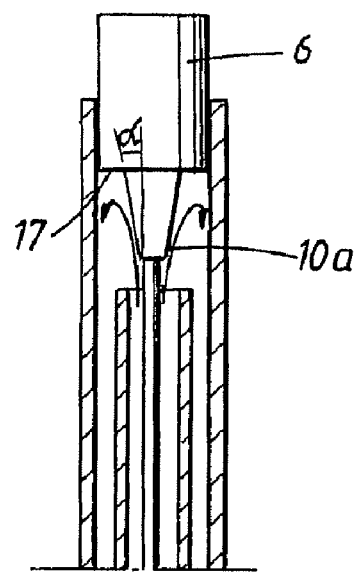
FIG. 6 illustrates the flowing geometry around the fiber end.

FIG. 1 illustrates the general design of an optical fiber. The optical fiber comprises an inner core 1, made of for instance quartz glass, for propagating radiation, and a surrounding cladding 2, for example made of glass or some polymer having a suitable refractive index. The cladding 2 might be in the form of one or more layers and the object of the cladding is to optically "lock" the radiation into the core 1. Outside the cladding there are one or more protecting jackets to make the optical fiber more mechanically stable. These layers are mentioned as "buffers" or "jackets" and has been indicated as 3 and 4 in the figures. As the fiber is built into a connector member the fiber also has to be fixed positioned by means of any mechanical component, which is illustrated by means of an annular support element 5 in the figure.

In FIG. 2 it is illustrated a fiber connector in which the end surface of a fiber 1 is in optical contact with a cylindrical body made of a transparent material, for instance a rod or a bar member of quartz glass. The volume or spacing 7 behind the quartz body is swept over by a flowing coolant, indicated by arrows 8a and 8b, which coolant absorbs radiation which goes outside the core of the fiber. Arrows 8c and 8d indicate inlet and outlet openings for the coolant in the wall 9 of the connector. Normally the coolant is water which has an absorption depth of approximately 5 cm for radiation in the area of 1 micrometer. The coolant may be air. The end surface of the fiber is mechanically connected to the plane end surface 10 of the quartz rod, which end surface has a diameter exceeding the end surface diameter of the fiber. Fiber connectors of this type are previously known per se and it is referred to said EP 0 619 508.

As mentioned in the introductory portion the power density might be too high on the plane end surface 10 in case of an incorrect focusing of the connector with a risk for sudden boiling effects in the coolant and damages to the connector assembly, indicated by the dot 11 in FIG. 3. The risk for this is also increased due to the fact that the area behind 7 the quartz rod is not optimized from a flowing point of view. There is also a risk that the radiation hits the wall 9 of the connector, indicated by the dot 12 in FIG. 3. For that reason it would be desirable to deflect the radiation into the optical axis 13 to reduce such a risk.

In FIG. 4 it is illustrated a fiber connector according to the invention in which the end surface 10 of the quartz rod is made conical instead of the previous plane surface illustrated in FIGS. 2 and 3. The tip 10a of the conical surface is facing the end surface of the optical fiber so that the surface is diverging away from the fiber end. The base part of the conical surface is in this case connected to the inner wall 9 of the connector. By such a conical design or the like, the area of the surface which is in contact with the flowing coolant is increased compared to a plane surface. The flowing geometry is improved and the radiation is directed towards the optical axis thereby avoiding the risk for damages to the connector body, see FIG. 7. The cone angle α should be as small as possible, but it should exceed the exit angle of the radiation out of the fiber. Typically the cone angle α is in the interval of 10-45 degrees. The degree of surface increase of the end surface 10 depends on the cone angle. In the following table the approximate surface increase is indicated for some cone angles α. A plane surface is indicated as A0 and the conical surface is indicated as A1.

| α   | A1/A0 |
| --- | ----- |
| 10° | 6     |
| 20° | 3     |
| 30° | 2     |
| 40° | 1.5   |

Figure 7:
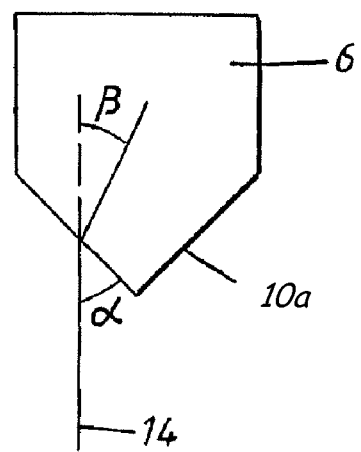
FIG. 7 illustrates how an optical radiation beam is deflected towards the optical axis of the connector.

The conical surface also means that a radiation beam 14 outside the core of the fiber is deviated towards the central axis, the optical axis 13 of the connector, when the beam hits the conical surface 10 of the quartz body. In FIG. 7 it is illustrated a radiation beam that falls on to the conical surface 10 under an angle β and which is refracted towards the optical axis, so that the outgoing beam 14 is parallel to the optical axis. The cone angle is indicated by α. The relation between the angles α and β is given in the following table. A large angle β means that a larger part of the incident radiation is focused towards the optical axis, instead of the wall 9 of the connector member. In this case a refractive index for water and quartz has been used and it is supposed that the radiation has a wavelength in the interval around 1 μm.

| α   | β   |
| --- | --- |
| 10° | 15° |
| 20° | 10° |
| 30° | 7°  |
| 40° | 5°  |

As indicated in the tables the size of the surface area as well as the deviation is improved by having a cone angle as small as possible. This is also true for the flowing geometry, as it is the area close to the fiber that is the most critical. The existing limit is the extension of the radiation at the exit of the fiber. If a numerical aperture, NA, is used for the fiber, the exit angle γ of the radiation out from the quartz rod satisfies the following formula $$\gamma = NA/n$$

where n represents the refractive index for the rod 6. To avoid an optical distorsion of the radiation, the value of the cone angle should exceed said exit angle. Provided $$\alpha = 1.5 * \gamma$$

then there is hardly any influence on the quality of the outgoing radiation beam. As already mentioned the cone angle is typically in the range of 10°-45°.

In order to even more improve the flowing geometry and avoid possible whirls or turbulence effects 15 in the corners, i.e. in the innermost spacing 16 between the base part of the conical surface of the rod and the surrounding connector wall 9, a peripheral shelf or ledge 17 might be formed at the base part of the conical surface 10 of the rod.

The invention is not limited to the examples that have been illustrated here but can be varied within the scope of the following claims.

The invention claimed is:

1. An optical fiber connector for transmitting high optical power, the connector comprising:
   an optical fiber configured to transmit high optical power of hundreds of watts up to 10 kW; and
   a body in direct optical contact with an end surface of the optical fiber, the body comprising a transparent material configured to transmit high optical power, the body comprising a surface having an area exceeding the end surface of the optical fiber, wherein said surface of the body is substantially conical, a spacing arranged around a contact end of the fiber and a base part of the conical surface, wherein a tip of the conical surface faces away from the end surface of the optical fiber such that the conical surface diverges away from the optical fiber, and
   a flowing coolant supplied to the spacing, wherein the conical surface of the body is in contact with the coolant.

2. The optical fiber connector according to claim 1, wherein said substantially conical surface is connected to a tip portion of an end of the optical fiber.

3. The optical fiber connector according to claim 1, wherein the body comprises quartz.

4. The optical fiber connector according to claim 2, wherein a cone angle of the conical surface exceeds an exit angle for a radiation beam emitted from the optical fiber.

5. The optical fiber connector according to claim 4, wherein said cone angle of the conical surface satisfies a formula $\alpha = 1.5 * \gamma$, where α represents the cone angle and γ represents the exit angle for a radiation beam emitted from the optical fiber.

6. The optical fiber connector according to claim 4, wherein the cone angle of the conical surface is in the interval of 10 to 45 degrees.

7. The optical fiber connector according to claim 1, wherein said flowing coolant comprises air.

8. The optical fiber connector according to claim 1, wherein said flowing coolant comprises a fluid.

9. The optical fiber connector according to claim 8, wherein incident radiation falling outside a core of the optical fiber is arranged to be at least partially absorbed in the flowing coolant.

10. The optical fiber connector according to claim 1, wherein the base part of the conical surface comprises a shelf or ledge to prevent possible whirls or turbulence effects in the flowing coolant.

* * * * *